United States Patent [19]
Yamamoto et al.

[11] Patent Number: 5,452,503
[45] Date of Patent: Sep. 26, 1995

[54] TURRET MACHINE TOOL

[75] Inventors: Hiroshi Yamamoto; Kaname Goto; Eiji Ryukawa, all of Sayama, Japan

[73] Assignee: Honda Giken Kogyo Kabushiki Kaisha, Tokyo, Japan

[21] Appl. No.: 283,943

[22] Filed: Aug. 1, 1994

[30] Foreign Application Priority Data

Nov. 15, 1993 [JP] Japan .................. 5-285063

[51] Int. Cl.⁶ .................................................. B23B 29/32
[52] U.S. Cl. ................................................. 29/40; 408/35
[58] Field of Search ............... 29/40, 335; 409/201, 409/211; 408/35, 53, 117, 126; 451/401; 483/32

[56] References Cited

U.S. PATENT DOCUMENTS

| | | | |
|---|---|---|---|
| 1,125,031 | 1/1915 | Chace | 184/6.14 |
| 3,845,532 | 11/1974 | Smith | 29/40 |
| 4,608,747 | 9/1986 | Link et al. | 483/25 |

FOREIGN PATENT DOCUMENTS

| | | | |
|---|---|---|---|
| 60-238204 | 11/1985 | Japan | 408/35 X |
| 857771 | 1/1961 | United Kingdom | 408/53 |
| 2262461 | 6/1993 | United Kingdom . | |

*Primary Examiner*—Z. R. Bilinsky

[57] ABSTRACT

A turret machine tool has a slide table mounted on a machine base for movement toward and away from a workpiece to be machined. A turret head is indexably mounted on the slide table, and a plurality of multispindle heads mounted on the turret head at spaced angular intervals in an indexing direction of the turret head, each of the multispindle heads having a plurality of spindles disposed therein. A plurality of machine tools mounted on respective ends of the spindles, and a plurality of spindle gears are mounted on the spindles, respectively. A driven gear is mounted in each of the multispindle heads in mesh with the spindle gears through a train of gears. A drive gear is axially movably disposed in the turret head for movement into and out of mesh with the driven gear in one of the multispindle heads which has been indexed. A plurality of gear shafts are supported in a cantilevered fashion by each of the multispindle heads and project toward the turret head, the train of gears and the driven gear being mounted on the gear shafts. The multispindle heads can be highly accurately installed on the turret head, and the train of gears can easily be serviced. The turret machine tool is relatively light in weight, and can be manufactured relatively inexpensively.

11 Claims, 8 Drawing Sheets

TURRET MACHINE TOOL

BACKGROUND OF THE INVENTION

1. Field of the Invention:

The present invention relates to a turret machine tool equipped with multispindle heads.

2. Description of the Background Art

One conventional turret machine tool having multispindle heads is known from Japanese laid-open patent publication No. 60-238204. As shown in FIG. 8 of the accompanying drawings, the conventional turret machine tool, generally designated by "a" has a slide table "b" mounted on a machine base (not shown) for movement toward and away from a workpiece "W". A cylindrical turret head "c" is indexably supported on an upper end of the slide table "b". The turret head "c" supports a plurality of multispindle heads "d" angularly spaced in an indexing direction. Each of the multispindle heads "d" has a pair of vertically spaced through holes "e" extending from a front end to a rear end of the multispindle head. Spindle shafts "f" extend axially through and are rotatably supported in the respective through holes "e" by bearings "g".

A machining tool "i" is replaceably mounted on the front end of each of the spindles "f" by a tool holder "h". An oil seal "j" is disposed between the front end of each of the spindles "f" and an inner wall surface of the corresponding through hole "e" for preventing foreign matter such as a cutting fluid, chips, or the like from entering the gap between the spindle "f" and the inner wall surface of the through hole "e".

Spindle gears "k" are mounted on the respective rear ends of the spindles "f". The spindle gears "k" are held in mesh with a driven gear "m" disposed substantially centrally in the rear end of the multispindle head "d" through a train of gears "n". The driven gear "m" and the gears "n" have respective gear shafts "o", "p" which are rotatably supported at their ends (left-hand ends) remote from the turret head "c" in the multispindle head "d" by respective bearings "q". The other ends (right-hand ends) of the gear shafts "o", "p" are rotatably supported in a gearcase "r" mounted on the rear end of the multispindle head "d" by respective bearings "s".

A drive gear "t" axially movably disposed in the turret head "c" can be brought into and out of mesh with the driven gear "m" of the multispindle head "d" which has been indexed. The drive gear "t" and the driven gear "m" jointly constitute a clutch mechanism for selectively transmitting rotary power from a drive mechanism to the spindles "f" and the machining tools "i".

When one of the multispindle heads "d" is indexed into the machining position confronting the workpiece "W", the turret head "c" moves toward the workpiece "W" and the drive gear "t" axially moves into mesh with the driven gear "m". Rotary power from the drive mechanism is now transmitted to the machining tools "i", which machine the workpiece "W". After the workpiece "W" has been machined, the turret head "c" is retracted away from the workpiece "W", moving the machining tools "i" away from the workpiece "W".

In the turret machine tool "a" the gearcase "r" is mounted on the rear end of each multispindle head "d" so that the opposite ends of the gear shafts "o", "p" of the gears "m", "n" are supported in the multispindle head "d" and the gearcase "r", respectively. The opposite ends of the gear shafts "o", "p" are supported in order to fully bear the machining load applied through the machining tools "i" the spindles "f" and the spindle gears "k" to the gears "n" and transmit the rotary power smoothly to the machining tools "i" when the workpiece "W" is machined.

However, since the gearcase "r" is mounted on the rear end of each multi spindle head "d", the multispindle head "d" has to be installed on the turret head "c" through the gearcase "r". Such indirect mounting of the multispindle head "d" tends to produce an installation error of the multispindle head "d", ie., to reduce the installation accuracy of the multispindle head "d" with respect to the turret head "c". The gearcase "r" also makes it inconvenient to service the gears "n" and related components.

Inasmuch as the gearcase "r" needs to have a wall thickness large enough to bear the machining load, the overall machine tool weight is large. The cost of the gearcase "r" is high because a plurality of highly accurate attachment holes for receiving the bearings "s" have to be defined in the gearcase "r".

The turret head "c" and the gearcase "r" are filled with a liquid lubricating oil for lubricating the drive gear "t" the driven gear "m" the gears "n" and the spindle gears "k". To prevent the lubricating oil from leaking out of the turret head "c" and the gearcase "r", seal members "u" are interposed between attachment surfaces of the turret head "c" and the gearcase "r" and between attachment surfaces of the gearcase "r" and the multispindle head "d". The seal members "u" thus interposed are also responsible for lowering the installation accuracy of the multispindle head "d" with respect to the turret head "c".

Generally, the bearings "g" by which the spindles "f" are rotatably supported in the multispindle head "d" are lubricated by grease. If the oil seals "j" are damaged or deteriorated or the pressure in the multispindle head "d" is lowered due to a reduction in the temperature therein after the spindles "f" stop rotating, then gaps are liable to develop around the oil seals "j", allowing foreign matter such as a cutting fluid, chips, or the like to enter the gaps around the spindles "f". When this happens, the viscosity of the grease decreases, tending to cause seizure of the spindles "f". If the cutting fluid, chips, or the like is mixed into the lubricating oil in the gear case "f", then the spindle gears "k" and the gears "n" will not sufficiently be lubricated. It is therefore desirable to reliably prevent such foreign matter from entering the gaps around the spindles "f".

To define two or more closely positioned holes in a workpiece, it is necessary to minimize the diameter of the spindles "f" for reducing the interaxial distance between two or more machining tools "i" which are mounted on the spindles "f". However, the spindles "f" are required to be relatively large in diameter to maintain a rigidity large enough to withstand external forces such as torsional forces that are applied to the spindles "f" while the workpiece "W" is being machined by the machining tools "i". The spindle diameter requirement poses a limitation on design efforts to reduce the distance between holes that can be machined in the workpiece "W".

SUMMARY OF THE INVENTION

It is therefore an object of the present invention to provide a turret machine tool which has a multispindle head that can be installed accurately on a turret head, has a train of gears that can easily be serviced, is relatively light in weight, and is manufactured relatively inexpensively.

Another object of the present invention is to provide a turret machine tool which is arranged to reliably prevent foreign matter such as a cutting fluid, chips, or the like from entering gaps around spindles.

Still another object of the present invention is to provide a turret machine tool which can machine closely spaced holes in a workpiece.

To achieve the above objects, there is provided in accordance with the present invention a turret machine tool, comprising a machine base, a slide table mounted on the machine base for movement toward and away from a workpiece, a turret head indexably mounted on the slide table, a plurality of multispindle heads mounted on the turret head at spaced angular intervals in an indexing direction of the turret head, each of the multispindle heads having a plurality of spindles disposed therein, a plurality of machine tools mounted on respective ends of the spindles, a plurality of spindle gears mounted on the spindles, respectively, a driven gear mounted in each of the multispindle heads in mesh with the spindle gears through a train of gears, a drive gear axially movably disposed in the turret head for movement into and out of mesh with the driven gear in one of the multispindle heads which has been indexed, and a plurality of gear shafts supported in a cantilevered fashion by each of the multispindle heads and projecting toward the turret head, the train of gears and the driven gear being mounted on the gear shafts.

The train of gears and the driven gear are mounted on the gear shafts supported in the multispindle head in a cantilevered fashion. Therefore, no gearcase is required which would otherwise be necessary to support the ends of the gear shafts close to the turret head. Since no gearcase is required, the multispindle head can be mounted directly on the turret head with high accuracy. The gear train and other associated components can easily be serviced as no gearcase is required to be detached. With no gearcase employed, the turret machine tool is relatively light in weight. Since no bearings are required to support the ends of the gear shafts closely to the turret head, it is not necessary to define highly accurate holes for installing such bearings. Consequently, the turret machine tool can be manufactured relatively inexpensively.

The ends of the gear shafts remote from the turret head are fixed to and cantilevered from the multispindle head, and the train of gears and the driven gear are mounted on the other ends of the gear shafts close to the turret head. Therefore, a cantilevered support structure for the gear train and the driven gear is easily achieved.

The bearing is mounted in the turret head closely to the driven gear, and the gear shaft of the driven gear is axially movably and rotatably supported by the bearing. Even when the gear shaft of the driven gear is subjected to a cantilever load due to the machining load that is transmitted from the machining tools through the spindles, the spindle gears, and the trail of gears to the driven gear 29, the cantilever load is applied through the gear shaft of the drive gear meshing with the driven gear to the bearing, and borne by the bearing. As a result, the assembly of shaft portions between the supported end of the driven gear and the bearing is relatively short and virtually supported at its opposite ends. The turret machine tool is thus suitable for machining workpieces which apply relatively large machining loads.

The components in the turret head may be lubricated by a liquid lubricating oil, but should preferably be lubricated by an oil mist introduced into the turret head under a pressure higher than the atmospheric pressure.

It is not necessary to interpose seal members between the multispindle head and the turret head. Accordingly, the multispindle head is highly accurately installed on the turret head. Since the train of gears and the driven gear are disposed so as to face into the turret head, the turret head and the multispindle head communicate with each other, and the bearings which support the train of gears and the spindles can be lubricated simultaneously. If gaps are produced around oil seals which are mounted to prevent foreign matter such as a cutting fluid, chips, or the like from entering gaps around the spindles, then the oil mist is ejected out through the gaps around the oil seals. The ejected oil mist is effective in preventing such foreign matter from entering the gaps around the spindles.

The slide table has a space defined therein in communication with the turret head, and an oil mist supply means for supplying the oil mist is mounted in the slide table for introducing an oil mist through the space into the turret head. With this arrangement, since no rotary joint is employed to join the oil mist supply means, the turret machine tool is relatively simple in structure.

The spindles are disclosed closely to each other, and spindle gears are mounted on intermediate portions of the spindles, respectively, and an intermediate gear meshes between the spindle gears and the train of gears.

Therefore, the distance from the spindle gears to the machining tools is shorter than if the spindle gears were mounted on the rear ends of the spindles. Such a structure is effective in greatly reducing external forces such as torsional forces acting on the spindles while the workpiece is being machined. Accordingly, the diameter of the spindles may be reduced while maintaining their rigidity against such external forces. As a result, the interaxial distance between the machining tools mounted on the respective spindles may be reduced.

The intermediate gear comprises a single gear meshing with the spindle gears. The intermediate gear is thus simple in structure. The spindle gears are spaced from each other in an axial direction of the spindles, so that the spindles and hence the machining tools can be disposed closely to each other. The turret machine tool may further comprise a spindle housing detachably mounted in each of the multispindle heads, the spindles and the intermediate gear being housed in the spindle housing. Machining tools which are positioned in different arrangements and/or belong to different types may easily be mounted on the multispindle head depending on the purpose for which the workpiece is machined. The spindles, the spindle gears, and the intermediate gear can easily and quickly be serviced simply by removing the spindle housing from the through hole.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
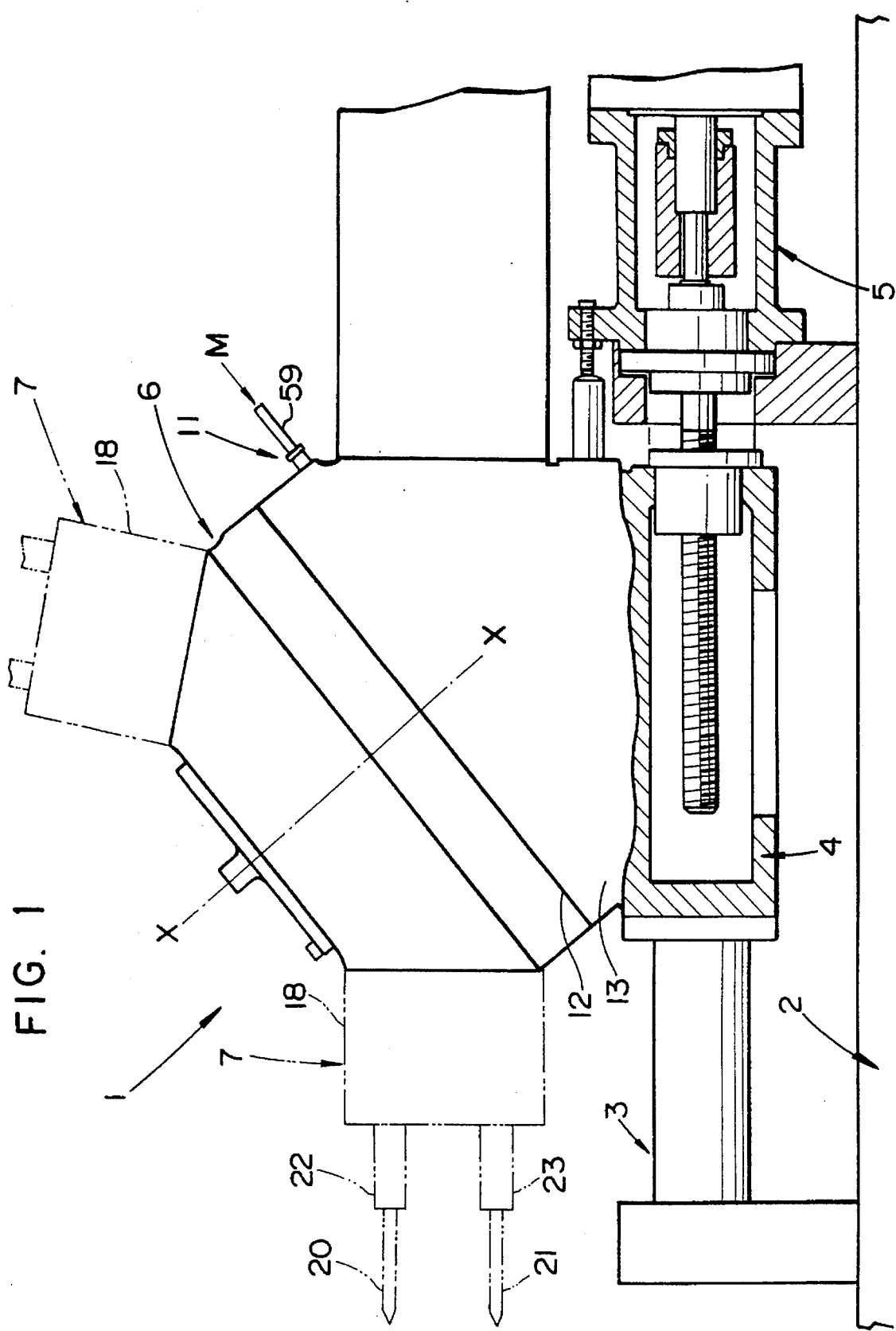
FIG. 1 is a fragmentary side elevational view, partly in cross section, of a turret machine tool according to the present invention.
Figure 2:
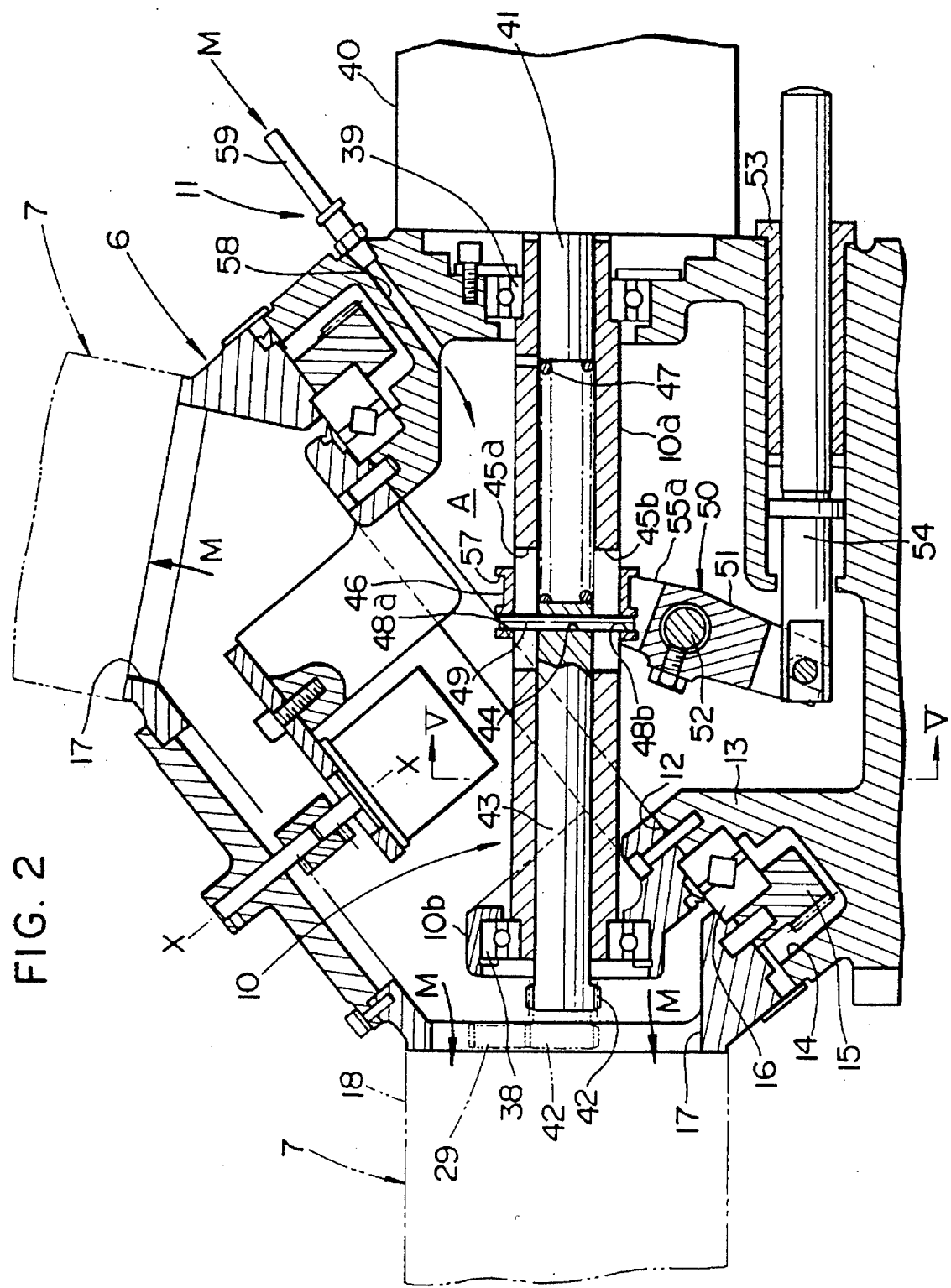
FIG. 2 is an enlarged cross-sectional view of a turret head of the turret machine tool shown in FIG. 1.
Figure 3:
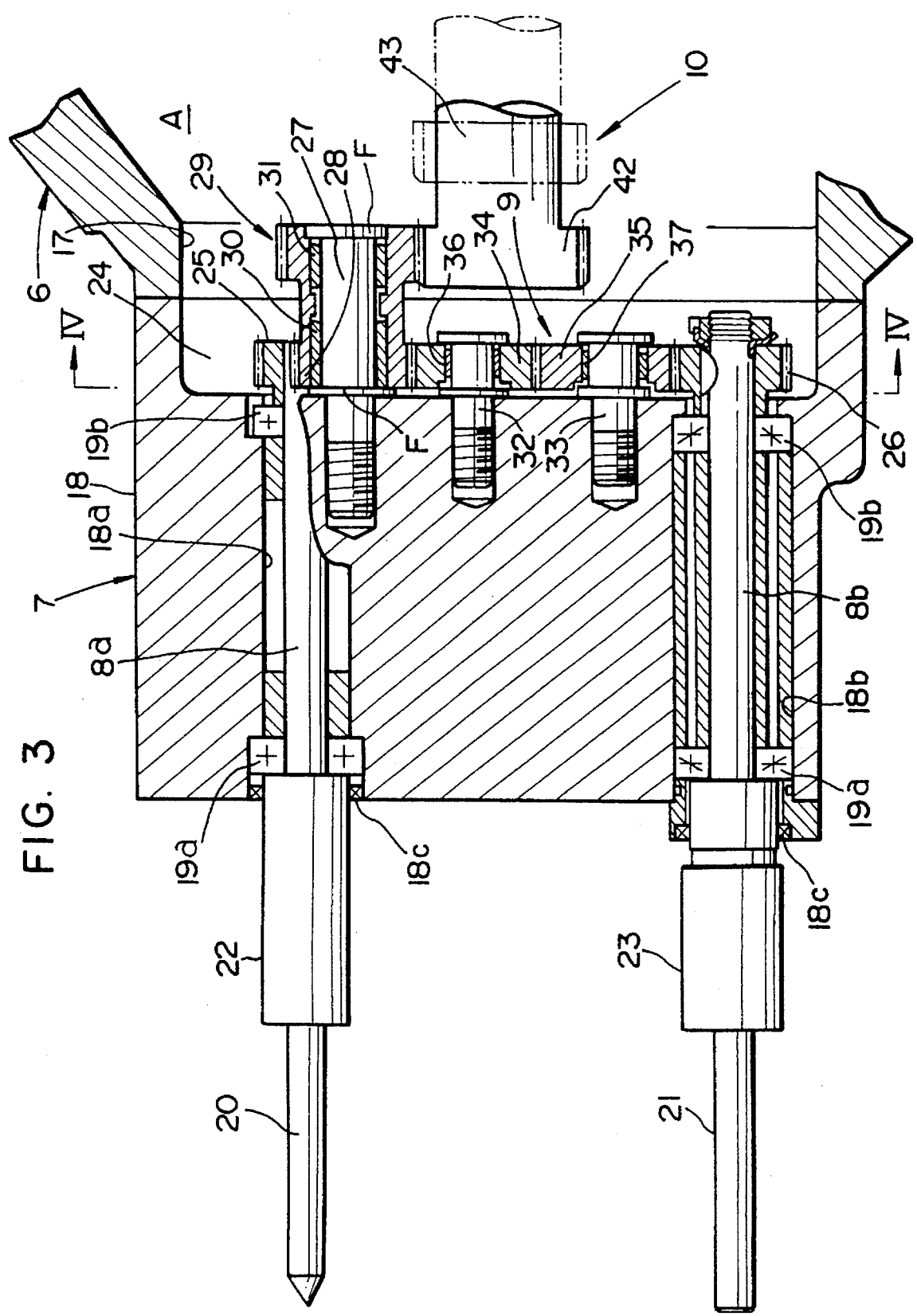
FIG. 3 is an enlarged cross-sectional view of a multispindle head of the turret machine tool shown in FIG. 1.

As shown in FIGS. 1 through 3, a turret machine tool 1 according to the present invention comprises a slide table 4 slidably fitted over a guide rail 3 mounted on and extending above a machine base 2, a ball screw feed mechanism 5 coupled to a lower rear end of the slide table 4 for slidingly moving the slide table 4 along the guide rail 3, a turret head 6 mounted on an upper end of the slide table 4 for indexing movement about an oblique indexing axis X—X which is inclined to the left in an upward direction, a plurality of multispindle heads 7 mounted on the turret head 6 at angularly spaced intervals in an indexing direction about the indexing axis X—X, a drive shaft 10 for transmitting rotary power to spindles 8a, 8b in each of the multispindle heads 7 through a gear train 9, and an oil mist supply means 11 for introducing an oil mist "M" under a given pressure into the turret head 6 to lubricate the drive shaft 10, the gear train 9, and the spindles 8a, 8b and prevent foreign matter such as a cutting fluid, dust, or the like from entering gaps around the spindles 8a, 8b.

As shown in FIGS. 1 and 2, the slide table 4, which is of a hollow structure, has a substantially cylindrical turret head attachment 13 having a slant surface 12 which is inclined to the right in the upward direction. As shown in FIG. 2, the slant surface 12 has an annular groove 14 defined therein.

The turret head 6 is of a hollow frustoconical structure having a flat surface on its top. As shown in FIG. 2, a ring gear 15 is fastened by screws to the bottom of the turret head 6 in concentric relation to the indexing axis X—X. The ring gear 15 is angularly movably supported in the annular groove 14 by a bearing 16. With the ring gear 15 supported in the annular groove 14, the turret head 6 and the slide table 4 communicate with each other, with a space "A" defined therein. The ring gear 15 is held in mesh with a drive gear of an indexing device (not shown). When the indexing device is actuated, the drive gear rotates the ring gear 15 thereby to index the turret head 6 about the indexing axis X—X.

Each of the multispindle heads 7 has a head block 18 made of aluminum. As shown in FIGS. 2 and 3, the head block 18 of each multispindle head 7 is mounted on one of a plurality of openings 17 defined at equal angular intervals in the circumferential wall surface of the turret head 6 around the indexing axis X—X.

As shown in FIG. 3, the head block 18 has two vertically spaced through holes 18a, 18b extending from a front end to a rear end thereof. Two spindles 8a, 8b are inserted respectively in the through holes 18a, 18b. Each of the spindles 8a, 8b has opposite ends rotatably supported in the head block 18 by respective bearings 19a, 19b. Machining tools 20, 21 are replaceably mounted on respective front ends of the spindles 8a, 8b. The spindles 8a, 8b have respective rear ends projecting into a recess 24 defined in the rear end of the head block 18 coextensively in communication with the opening 17. Spindle gears 25, 26 are mounted on the projecting rear ends of the spindles 8a, 8b.

Oil seals 18c are disposed between the spindles 8a, 8b and the front ends of inner wall surfaces of the through holes 18a, 18b. The gaps around the spindles 8a, 8b are held in communication with the space "A" through the opening 17.

In FIG. 3, a gear shaft 27 is disposed below the spindle gear 25 on the rear end of the spindle 8a and extends parallel to the spindles 8a, 8b. The gear shaft 27 has an end (left-hand end) threaded in the bottom of the recess 24 remotely from the turret head 6, so that the gear shaft 27 is supported in a cantilevered fashion by the head block 18. The gear shaft 27 has an opposite end (right-hand end) over which an idle gear 28 and a driven gear 29 are rotatably fitted through needle bearings 30, 31, respectively. The idle gear 28 and the driven gear 29 are integrally joined axially to each other for increased rigidity. The idle gear 28 and the driven gear 29 are retained on the gear shaft 27 by flanges "F" positioned on an intermediate portion and the right-hand end of the gear shaft 27. The idle gear 28 is held in mesh with the spindle gear 25. A drive gear 42 disposed in the opening 17 in the turret head 6 is axially movable into and out of mesh with the driven gear 29.

Figure 4:
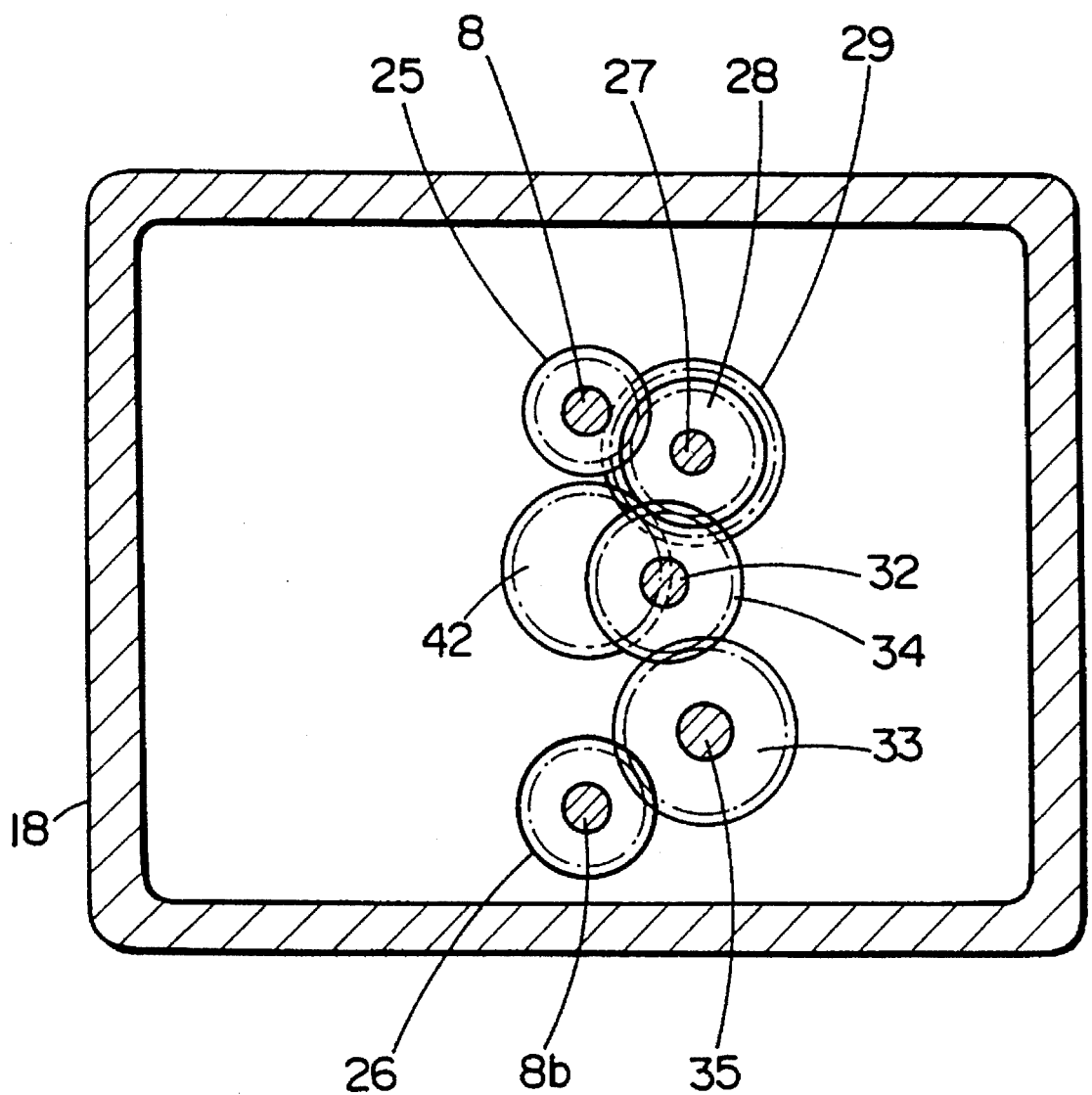
FIG. 4 is a cross-sectional view taken along line IV—IV of FIG. 3.

Between the gear shaft 27 and the spindle gear 26 on the rear end of the spindle 8b, there are disposed two vertically spaced gear shafts 32, 33 extending parallel to each other. The gear shafts 32, 33 have ends threaded in the bottom of the recess 24 remotely from the turret head 6, so that the gear shafts 32, 33 are supported in a cantilevered fashion by the head block 18. Idle gears 34, 35 are rotatably fitted over the respective opposite ends of the gear shafts 32, 33 through respective needle bearings 36, 37. The idle gear 34 is held in mesh with the idle gear 28, and the idle gear 35 is held in mesh with the idle gear 34 and the spindle gear 26. Therefore, as shown in FIGS. 3 and 4, the driven gear 29 meshes with the spindle gear 25 through the idle gear 28, and with the spindle gear 26 through the idle gears 28, 34, 35, of which the gear train 9 is composed.

As shown in FIG. 2, the drive shaft 10 comprises a horizontally elongate cylindrical shaft 10a disposed in the space "A". The shaft 10a has a left-hand end positioned closely to the driven gear 29, and is rotatably supported by a bearing 38 on a bracket 10b.

The right-hand end of the shaft 10a is rotatably supported by a bearing 39 in a vertically elongate wall (right-hand wall) of the turret head attachment 13. A drive motor 40 has a motor shaft 41 coupled to the right-hand end of the shaft 10a. Therefore, when the drive motor 40 is energized, the shaft 36 is rotated about its own axis.

The drive gear 42 has a gear shaft 43 is axially slidably and corotatably in the left-hand end portion of the shaft 10a. The gear shaft 43 has a diametrical through hole 44 defined in a right-hand end thereof. The through hole 44 communicates with a pair of slots 45a, 45b defined substantially centrally in the shaft 10a and circumferentially spaced 180° from each other. A relatively short sleeve 46 is axially slidably fitted over a substantially central portion of the shaft 10a. The gear shaft 43 is normally urged to move toward the driven gear 29 by a spring 47 which is disposed in the shaft 10a between the shafts 43, 41.

The sleeve 46 has a pair of through holes 48a, 48b defined radially in a left-hand end thereof and circumferentially spaced 180° from each other. The through holes 48a, 48b communicate with the slots 45a, 45b and the through hole 44. A joint pin 49 is inserted through the through hole 48a, the slot 45a, the through hole 44, the slot 45b, and the through hole 48b, thus integrally joining the sleeve 46, the shaft 10a, and the gear shaft 43 to each other. When the shaft 10a rotates, the sleeve 46 and the gear shaft 43 rotate in unison with the shaft 10a. The joint pin 49 is movable in the slots 45a, 45b in the axial direction of the shaft 10a for allowing the gear shaft 43 to slide with the sleeve 46. The gear shaft 43 and the sleeve 46 are axially slidable together by a shift mechanism 50.

Figure 5:
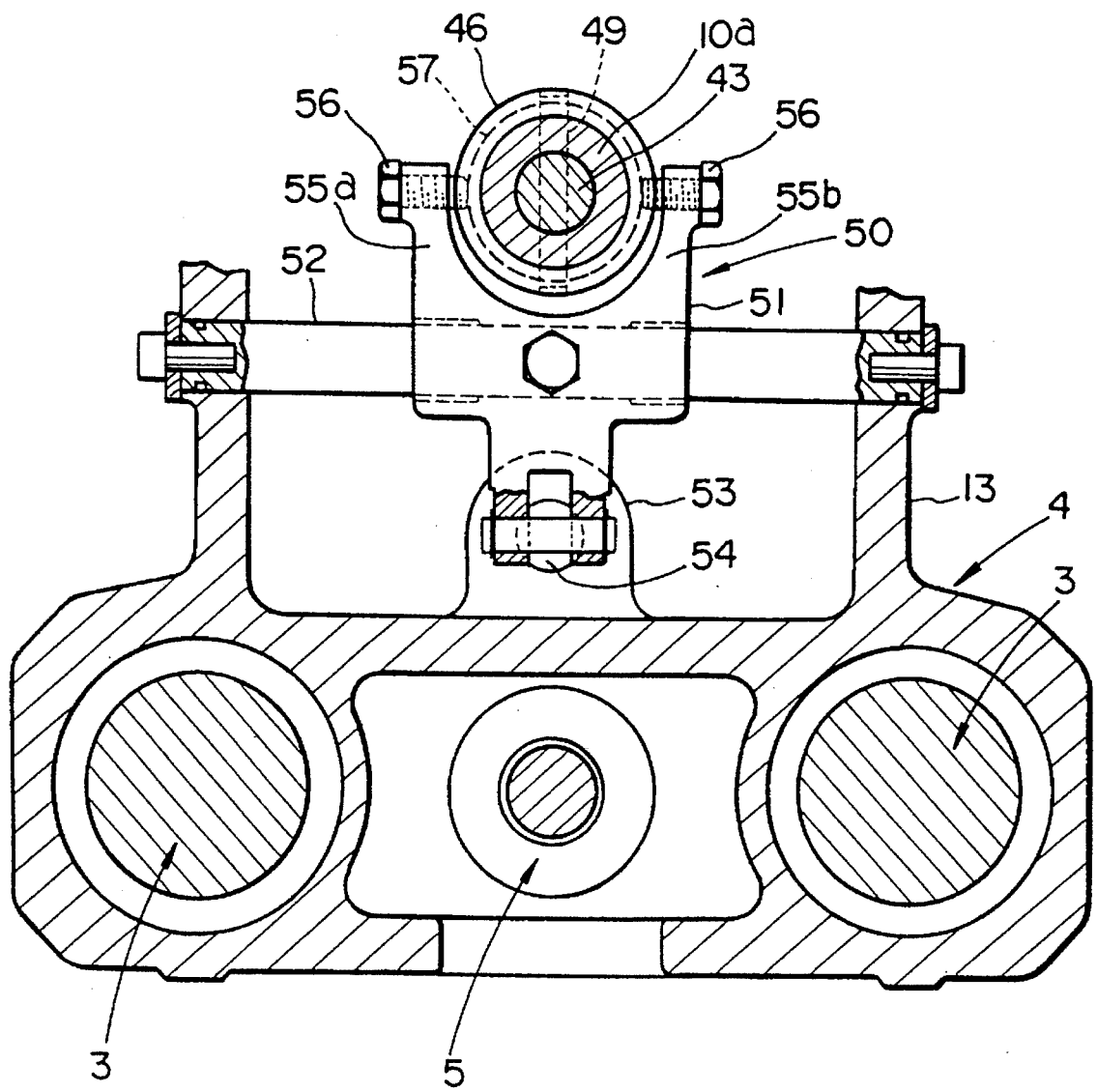
FIG. 5 is a cross-sectional view taken along line V—V of FIG. 2.

The shift mechanism 50 comprises a link 51 disposed underneath the sleeve 46. As shown in FIG. 5, the link 51 is supported for swinging movement in the axial direction of the sleeve 46 by a support shaft 52 which has opposite ends fixed to opposite side walls of the slide table 4. The link 51 has a lower end angularly movably coupled to a piston rod 54 of a cylinder 53 that is disposed in a lower portion of the rear end of the slide table 4. When the cylinder 53 is actuate to extend or retract the piston rod 54, the link 51 is turned about the support shaft 52.

The link 51 has an upper end bifurcated into two arms 55a, 55b which are disposed one on each side of a right-hand end portion of the sleeve 46. Bolts 56 threadedly extend through the respective arms 55a, 55b from their outer wall surfaces and project inwardly from inner wall surfaces thereof into an annular groove 57 defined in the outer circumferential surface of the right-hand end portion of the sleeve 46. The tip ends of the bolts 56 are held out of contact with the bottom of the annular groove 57.

When the piston rod 54 of the cylinder 53 is extended, the upper end of the link 51 is turned to the right in FIG. 2, causing the tip ends of the bolts 56 to press a right-hand wall of the annular groove 57. The sleeve 46 and the gear shaft 43 are now slid together to the right against the bias of the spring 47 until the drive gear 42 is shifted out of mesh with the driven gear 29.

When the piston rod 54 of the cylinder 53 is retracted, the upper end of the link 51 is turned to the left while the tip ends of the bolts 56 are being held in abutment against the right-hand wall of the annular groove 57 under the bias of the spring 47. The sleeve 46 and the gear shaft 43 are now slid together to the left until the drive gear 42 is shifted into mesh with the driven gear 29, whereupon rotary power from the drive shaft 10 can be transmitted to the driven gear 29. At this time, the tip ends of the bolts 56 are positioned substantially at the center of the annular groove 57 out of contact with the right- and left-hand walls of the annular groove 57, allowing the sleeve 46, the shaft 10a, and the gear shaft 43 to rotate in unison with each other.

As shown in FIG. 2, the oil mist supply means 11 has a supply pipe 59. The supply pipe 59 has an end inserted in a through hole 58 defined in a right-hand side wall of the turret head attachment 13 of the slide table 4. The supply pipe 59 is held in communication with the space "A" through the hole 58. The other end of the pipe 59 is connected to an oil mist supply device (not shown).

The space "A" is supplied with an oil mist "M" from the oil mist supply device through the supply pipe 59 under a certain pressure which is slightly higher than the atmospheric pressure, e.g., a pressure of 0.3 kg/cm$^2$ in this embodiment. The mutually sliding surfaces of the shaft 10a and the gear shaft 43, the shift mechanism 50, the drive gear 42, the driven gear 29, the spindle gears 25, 26, the idle gears 28, 34, 35, and the spindles 8a, 8b are lubricated by the oil mist "M".

Since the space "A" communicates with the gaps around the spindles 8a, 8b through the opening 17, when the oil seals 18c are damaged or deteriorated to produce gaps around the oil seals 18c, the oil mist "M" is ejected out through the produced gaps around the oil seals 18c.

When gaps are produced around the oil seals 18c due to a reduction in the pressure in the turret head 6 and the multispindle head 7 after a workpiece has been machined, the oil mist "M" is ejected out through the produced gaps around the oil seals 18c even through the oil seals 18c are normal. Therefore, even if foreign matter such as a cutting fluid, chips, or the like tends to enter the gaps around the spindles 8a, 8b when or after the workpiece is machined, the foreign matter is prevented from entering the gaps around the spindles 8a, 8b due to the pressure of the oil mist "M" ejected out through the produced gaps around the oil seals 18c.

The turret machine tool 1 operates as follows: The drive gear 42 is axially moved into mesh with the driven gear 29 of the multispindle head 7 which has been indexed into a workpiece machining position. As shown in FIGS. 3 and 4, rotary power from the drive shaft 10 can now be transmitted through the drive gear 42, the driven gear 29, the idle gear 28, the spindle gear 25, and the spindle 8a to the machining tool 20, and also through the drive gear 42, the driven gear 29, the idle gear 28, the idle gears 34, 35, the spindle gear 26, and the spindle 8b to the machining tool 21.

When rotary power from the drive shaft 10 is transmitted to the machining tools 20, 21, the slide table 4 is horizontally moved toward the workpiece by the ball screw feed mechanism 5, and the workpiece is machined by the machining tools 20, 21.

While the workpiece is being machined by the machining tools 20, 21, the gear shaft 27 of the driven gear 29 is subjected to a cantilever load due to the machining load that is transmitted from the machining tools 20, 21 through the spindles 8a, 8b, the spindle gears 25, 26, and the idle gears 28, 34, 25 to the driven gear 29. The cantilever load is applied through the gear shaft 43 of the drive gear 42 meshing with the driven gear 29 and the shaft 10a to the bearing 38 (see FIG. 2) positioned closely to the driven gear 29, and borne by the bearing 38. As a result, the assembly of shaft portions between the supported end of the driven gear 29 and the bearing 38 is relatively short and virtually supported at its opposite ends. Even if the machining load is large, it can sufficiently be borne, and rotary power from the drive shaft 10 can smoothly be transmitted to the machining tools 20, 21.

In the turret machine tool 1, the gear shafts 27, 32, 33 of the idle gears 28, 34, 35 and the driven gear 29 are supported by the head block 28 in a cantilevered fashion, and the idle gear 28 and the driven gear 29, the idle gear 32, and the idle gear 33 are rotatably fitted over the respective ends of the gear shafts 27, 32, 33 close to the turret head 6.

Therefore, no gearcase is required which would otherwise be necessary to support the ends of the gear shafts 27, 32, 33 close to the turret head 6 as is the case with the conventional turret machine tool. Since no gearcase is required, the multispindle head 7 can be mounted directly on the turret head 6. The multispindle head 7 can thus be installed more accurately on the turret head 6 than if the multispindle head 7 were installed on the turret head 6 through a gearcase. The direct installation of the multispindle head 7 on the turret head 6 allows the turret head 6 and the multispindle head 7 to be joined to each other with greater rigidity. The gear train 9 and other associated components can easily be serviced as no gearcase is required to be detached. With no gearcase employed, the turret machine tool 1 is relatively light in weight. Since no bearings are required to support the ends of the gear shafts 27, 32, 33 closely to the turret head 6, it is not necessary to define highly accurate holes for installing such bearings. Consequently, the turret machine tool 1 can be manufactured relatively inexpensively.

Inasmuch as the components in the turret head 6 and the multispindle head 7 are lubricated by the oil mist "M", it is not necessary to interpose seal members between the multispindle head 7 and the turret head 6. Accordingly, the multispindle head 7 is installed on the turret head 6 highly accurately. As the supply pipe 59 for introducing the oil mist "M" into the turret head 6 is connected to the slide table 4 which does not rotate, the supply pipe 59 can be connected to the slide table 4 without using a rotary joint. Consequently, the turret machine tool 1 is relatively simple in structure.

A modified multispindle head 7 will be described below with reference to FIGS. 6 and 7. The modified multispindle head 7 differs from the multispindle head 7 in the above embodiment in that the head block 18 of the multispindle head 7 has a through hole 60 extending from a front end to a rear end thereof, and a multispindle unit 61 is detachably mounted in the through hole 60. The other details of the modified multispindle head 7 are identical to those of the multispindle head 7, and will not be described in detail below.

Figure 6:
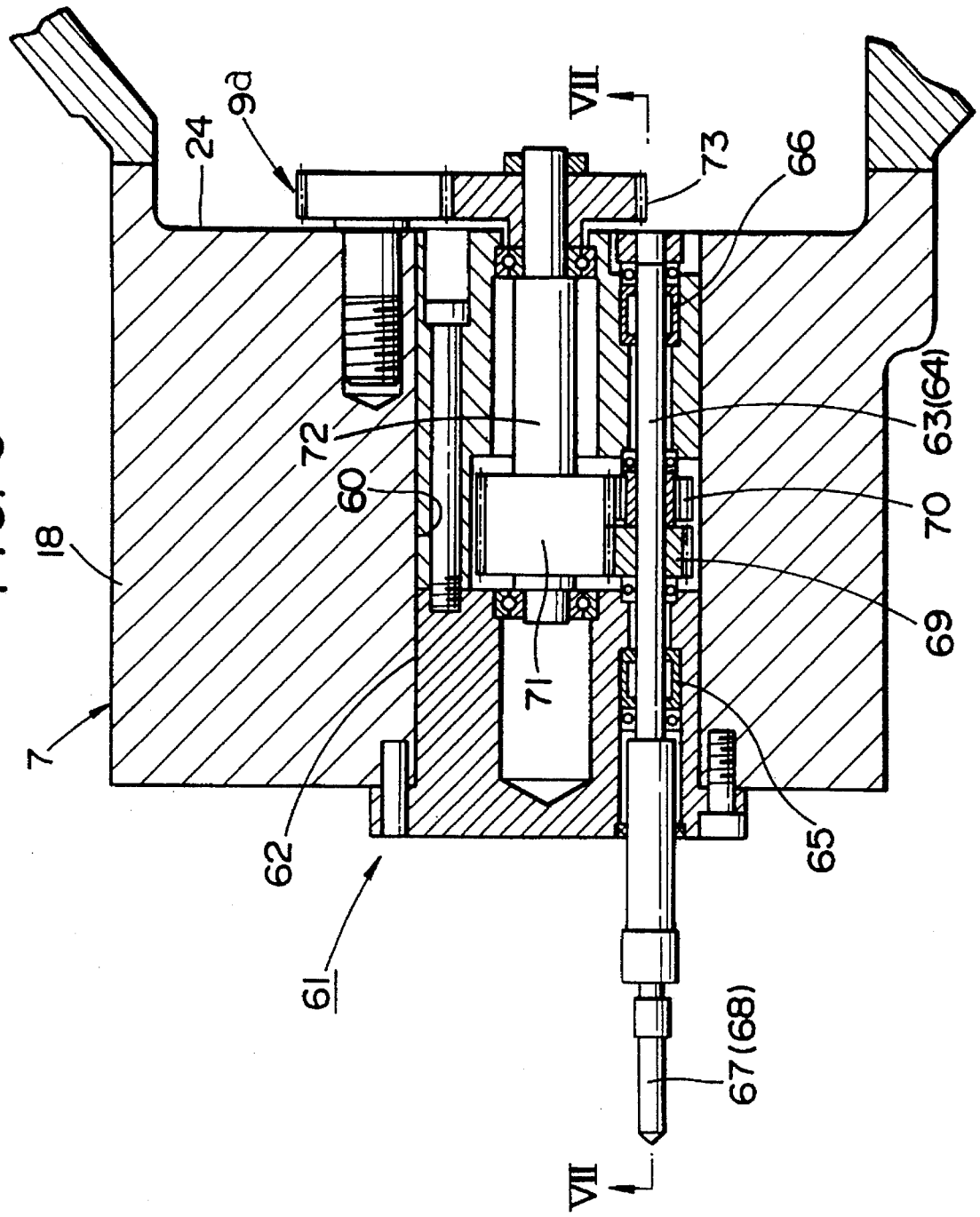
FIG. 6 is an enlarged cross-sectional view of a modified multispindle head.
Figure 7:
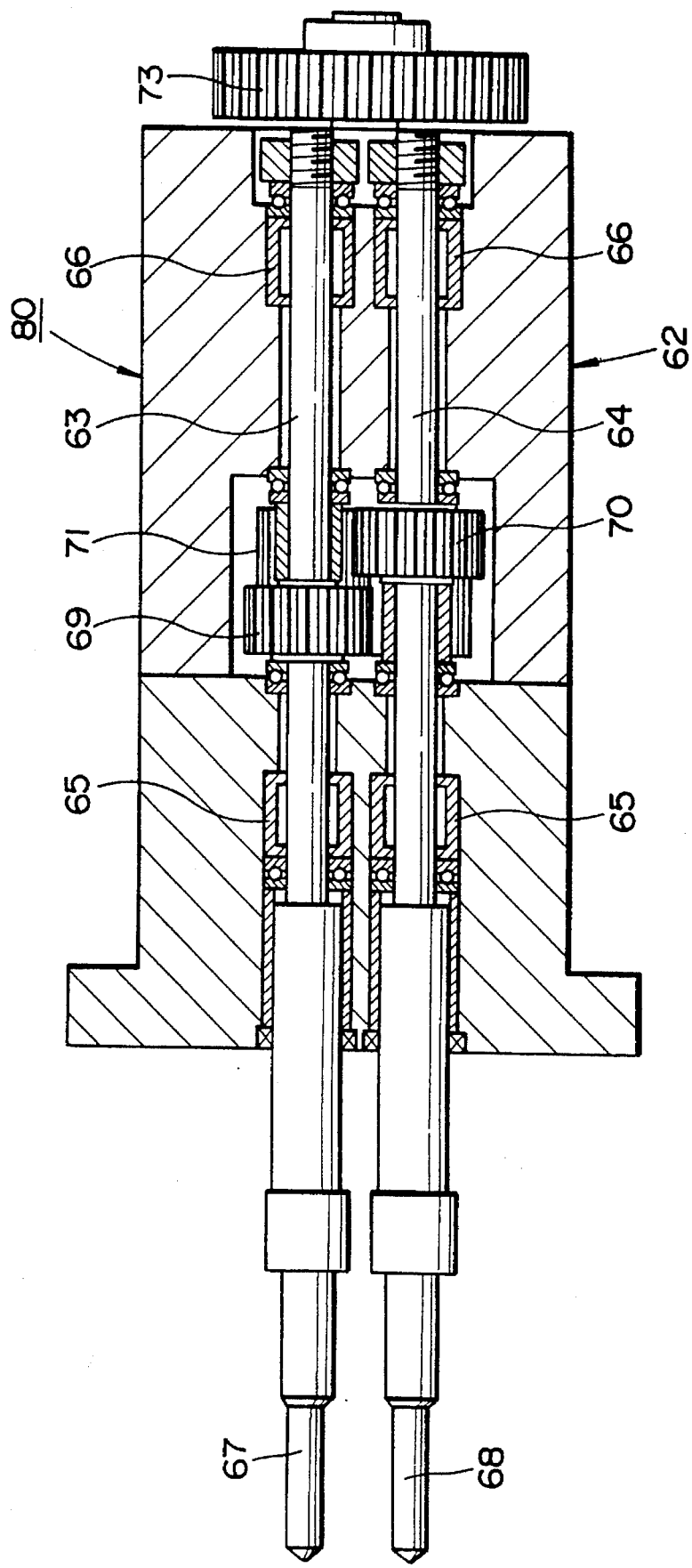
FIG. 7 is a cross-sectional view taken along line VII—VII of FIG. 6, showing a multispindle unit of the multispindle head.
Figure 8:
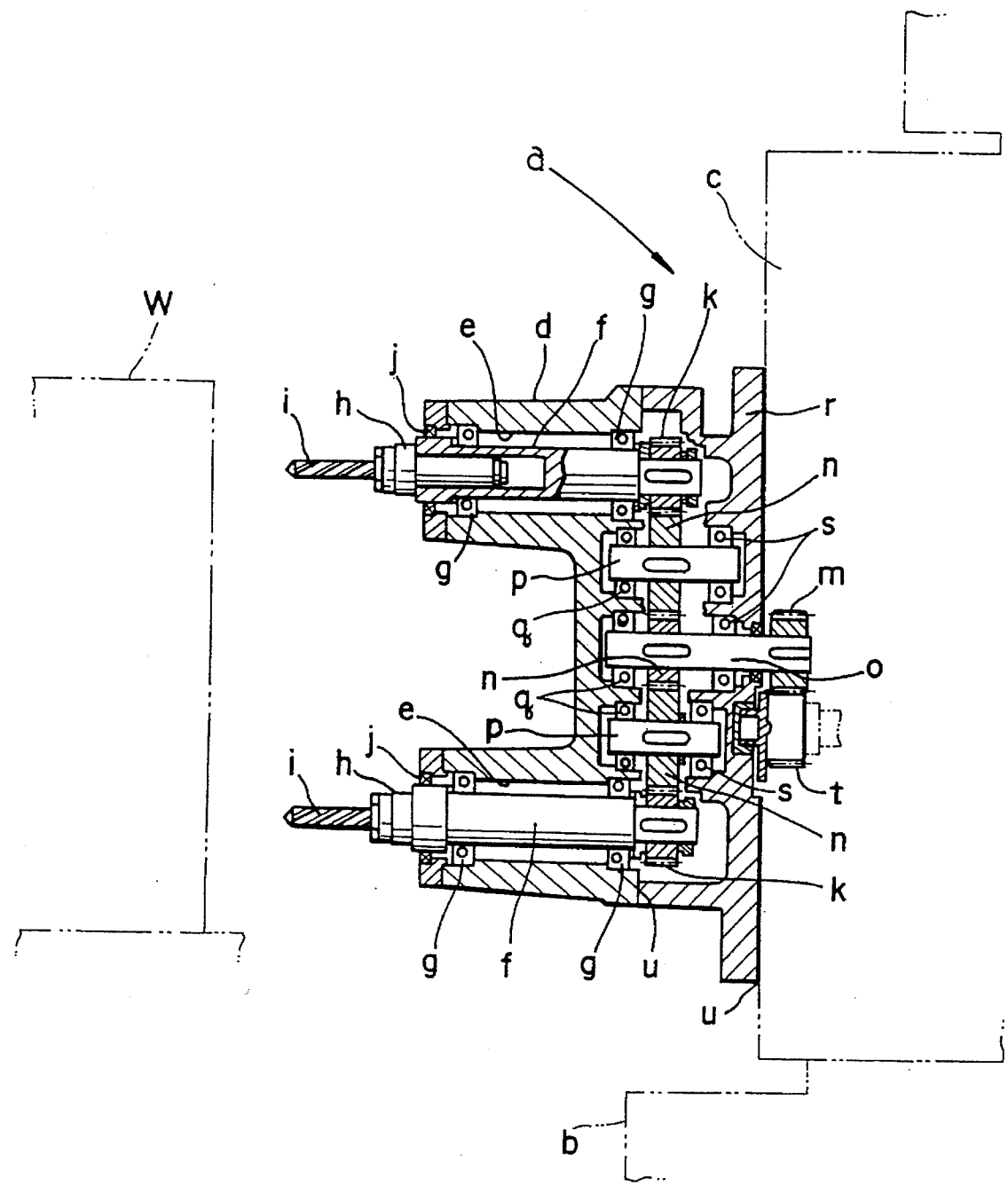
FIG. 8 is a cross-sectional view of a multispindle head of a conventional turret machine tool.

As shown in FIGS. 6 and 7, the multispindle unit 61 has a spindle housing 62 detachably mounted in the through hole 60 in the head block 18. Two spindles 63, 64 are disposed in the spindle housing 62 closely to each other. Each of the spindles 63, 64 has opposite ends rotatably supported by needle bearings 65, 66. Machining tools 67, 68 are mounted on the respective front ends of the spindles 63, 64.

Spring gears 69, 70 are mounted on the respective spindles 63, 64 between the needle bearings 65, 66. The spindle gears 69, 70 are spaced from each other in the axial direction of the spindles 63, 64. The spindle gears 69, 70 are held in mesh with a single intermediate gear 71 extending axially and mounted on a gear shaft 72 disposed in the spindle housing 62 parallel to the spindle shafts 63, 64. The gear shaft 72 has a right-hand end projecting from the spindle housing 62, with a joint gear 73 mounted on the projecting end of the gear shaft 72. The joint gear 73 is held in mesh with the spindle gear 25 (see FIG. 4) through a gear train 9a cantilevered in the recess 24 in the head block 18. Rotary power from the drive shaft can thus be transmitted to the spindles 63, 64 and hence the machining tools 67, 68.

In the modified multispindle head 7, the spindle gears 69, 70 are mounted on the intermediate portions of the spindles 63, 64. Therefore, the distance from the spindle gears 69, 70 to the machining tools 67, 68 is shorter than if the spindle gears 69, 70 were mounted on the rear ends of the spindles 63, 64. Such a structure is effective in greatly reducing external forces such as torsional forces acting on the spindles 63, 64 while the workpiece is being machined. Accordingly, the diameter of the spindles 63, 64 may be reduced while maintaining their rigidity against such external forces. As a result, the interaxial distance between the machining tools 67, 68 mounted on the respective spindles 63, 64 may be smaller than that in the conventional turret machine tool, so that holes can be defined in the workpiece at a reduced distance from each other.

Since the spindle gears 69, 70 are spaced from each other in the axial direction of the spindles 63, 64, the spindles 63, 64 may be positioned closely to each other, thereby reducing the interaxial distance between the machining tools 67, 68.

Because the multispindle unit 61 is detachably mounted in the head block 18, machining tools which are positioned in different arrangements and/or belong to different types may easily be mounted on the head block 18 depending on the purpose for which the workpiece is machined. The spindles 63, 64 can easily and quickly be serviced simply by removing the spindle housing 62 from the through hole 60.

Although certain preferred embodiments of the present invention has been shown and described in detail, it should be understood that various changes and modifications may be made therein without departing from the scope of the appended claims.

What is claimed is:

1. A turret machine tool, comprising:

a machine base;

a slide table mounted on said machine base for movement toward and away from a workpiece;

a turret head indexably mounted on said slide table;

a plurality of multispindle heads mounted on said turret head at spaced angular intervals in an indexing direction of said turret head, each of said multispindle heads having a plurality of spindles disposed therein;

a plurality of machine tools mounted on respective ends of said spindles;

a plurality of spindle gears mounted on said spindles, respectively;

a driven gear mounted in each of said multispindle heads in mesh with said spindle gears through a train of gears;

a drive gear axially movably disposed in said turret head for movement into and out of mesh with the driven gear in one of said multispindle heads which has been indexed; and a plurality of gear shafts non-rotatably supported in a cantilevered fashion by each of said multispindle heads, said gear shafts having ends projecting out from said multispindle head toward said turret head, said train of gears and said driven gear being mounted on said ends of said gear shafts, wherein said gear shafts are non-rotatably mounted in respective bores provided at different locations in said multispindle head, said train of gears and said driven gears being rotatably mounted on said ends of said gear shafts adjacent said multispindle head.

2. A turret machine tool according to claim 1, wherein said gear shafts have ends fixed to and cantilevered from the multispindle head remotely from said turret head, said train of gears and said driven gears being mounted on ends of said gear shafts close to said turret head.

3. A turret machine tool according to claim 1, further comprising a bearing mounted in said turret head closely to said driven gear, said gear shaft of the drive gear being axially movably and rotatably supported by said bearing.

4. A turret machine tool according to claim 1, further comprising oil mist supply means for introducing an oil mist into said turret head under a pressure higher than the atmospheric pressure.

5. A turret machine tool according to claim 4, wherein said slide table has a space defined therein in communication with said turret head, said oil mist supply means comprising means mounted in said slide table for introducing an oil mist through said space into said turret head.

6. A turret machine tool according to claim 1, wherein said spindles are disclosed closely to each other, further comprising spindle gears mounted on intermediate portions of said spindles, respectively, and an intermediate gear meshing between said spindle gears and said train of gears.

7. A turret machine tool according to claim 6, wherein said intermediate gear comprises a single gear meshing with said spindle gears.

8. A turret machine tool according to claim 6, wherein said spindle gears are spaced from each other in an axial direction of said spindles.

9. A turret machine tool according to claim 6, further comprising a spindle housing detachably mounted in each of said multispindle heads, said spindles and said intermediate gear being housed in said spindle housing.

10. A turret machine tool according to claim 2, further comprising a bearing mounted in said turret head closely to said driven gear, said gear shaft on the drive gear being axially movably and rotatably supported by said bearing.

11. A turret machine tool according to claim 7, wherein said spindle gears are spaced from each other in an axial direction of said spindles.

* * * * *